(12) United States Patent
Zhang et al.

(10) Patent No.: US 9,111,165 B2
(45) Date of Patent: Aug. 18, 2015

(54) METHOD AND SYSTEM FOR FILTERING DETECTION PATTERNS IN A QR CODE

(71) Applicants: PEKING UNIVERSITY FOUNDER GROUP CO., LTD., Beijing (CN); FOUNDER MOBILE MEDIA TECHNOLOGY (BEIJING) CO., LTD., Beijing (CN)

(72) Inventors: Ling Zhang, Beijing (CN); Chao Guan, Beijing (CN); Zhenhua Liu, Beijing (CN); Gezhang Liu, Beijing (CN); Wanyi Che, Beijing (CN)

(73) Assignees: PEKING UNIVERSITY FOUNDER GROUP CO., LTD., Beijing (CN); FOUNDER MOBILE MEDIA TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/102,654

(22) Filed: Dec. 11, 2013

(65) Prior Publication Data

US 2015/0090788 A1    Apr. 2, 2015

(30) Foreign Application Priority Data

Sep. 29, 2013  (CN) .......................... 2013 1 0459674

(51) Int. Cl.
*G06K 5/00* (2006.01)
*G06K 7/14* (2006.01)

(52) U.S. Cl.
CPC ............ *G06K 7/1473* (2013.01); *G06K 7/1417* (2013.01); *G06K 7/1452* (2013.01)

(58) Field of Classification Search
CPC ..... G06K 7/14; G06K 5/00; G06K 19/06037; G06K 7/1417; G06K 7/10722; G06K 7/1491; G06K 7/1486; G06K 7/10881; G06K 7/10851
USPC ............ 235/437, 494, 462.1, 462.11, 462.12, 235/462.16, 462.2
See application file for complete search history.

(56) References Cited

U.S. PATENT DOCUMENTS

2010/0155464 A1* 6/2010 Swayn et al. ................. 235/375

* cited by examiner

*Primary Examiner* — Karl D Frech
(74) *Attorney, Agent, or Firm* — Brinks Gilson & Lione (57) ABSTRACT

A method and system for filtering detection patterns in a QR code is provided in this invention. When multiple detection patterns get into a QR code image due to interference or other reasons, first of all, an side length is determined for each pattern to be detected, and then an average value of the side lengths of multiple patterns to be detected is determined, after which through comparing with a predetermined reference value, patterns to be detected meeting a predetermined condition are determined as detection patterns. An effective solution is provided to fill the gap in the prior art of unable to remove detection patterns caused by interference appropriately when more than three detection patterns are found.

17 Claims, 5 Drawing Sheets

METHOD AND SYSTEM FOR FILTERING DETECTION PATTERNS IN A QR CODE

CROSS-REFERENCE TO RELATED APPLICATIONS

This application claims priority to Chinese Patent Application No. 201310459674.3, filed on Sep. 29, 2013 and entitled "METHOD AND SYSTEM FOR FILTERING DETECTION PATTERNS IN A QR CODE", which is incorporated herein by reference in its entirety.

FIELD OF THE INVENTION

The present invention relates to a method for processing a two dimensional code image, and more particular, to a method and system for filtering multiple detection patterns of a QR code, which belong to the field of information image processing technology.

DESCRIPTION OF THE RELATED ART

Figure 1:
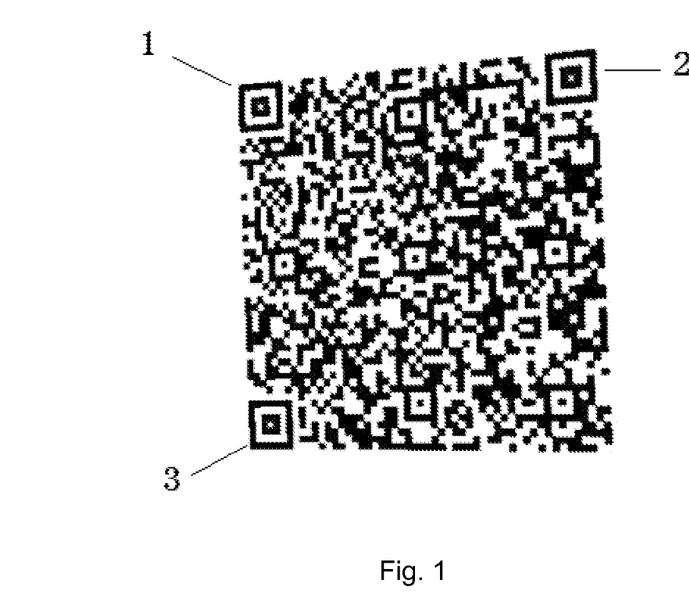
FIG. 1 is a schematic diagram of locations of detection patterns in a QR code image.

QR code is one kind of two dimensional codes, which has gained wider and wider applications due to advantages of fast reading speed, high data intensity and small footprints. The position, size, inclination of a QR code may be detected using a CCD reading device, and then the QR code may be decoded to realize fast omnidirectional reading and recognition of the QR code. As well known, when an image is recognized using an image reader, it must be located first, and then is processed according to some corresponding methods to obtain information carried in the image, which is the same for QR code without exception. A QR code may be located using three identical detection patterns on the upper left corner, upper right corner and lower left corner of the QR code respectively, as shown in FIG. 1. Each detection pattern may be considered as being composed of three superimposed concentric squares with 7×7 dark modules, 5×5 light modules, and 3×3 dark modules respectively. The detection pattern 1 locates on the upper left corner, detection pattern 2 locates on upper right corner, and detection pattern 3 locates on lower left corner. The detection pattern has a module width ratio of 1:1:3:1:1. The probability of encountering such a similar pattern at other places in the symbol is very low, and thus the CCD reading device may recognize a potential QR code symbol in its field of view rapidly. Regardless of external interference, a QR code image generally is shown as a square with three detection patterns located on three vertexes. Without severe distortions, an isosceles right triangle may be constructed by connecting all the detection patterns. After the recognition of the three detection patterns, the location and orientation of the QR code may be determined according to the geometrical relationship among the three detection patterns.

All the methods of locating detection patterns in the prior art operate on the basis of a default condition that there are only three detection patterns in a QR code image, and relative locations of the three detection patterns are determined through a sorting algorithm to locate the QR code image accurately. However, in practice, there may be situations where more than three detection patterns in an entire detection picture, including unwanted detection patterns that are introduced by interference, or patterns formed by other text or symbols in the picture and having similar structural characteristics to detection patterns that are determined as detection patterns by mistake. Existing CCD reading devices are helpless for these situations. How to filter appropriate detection patterns from multiple patterns that are detected is not disclosed in the prior art.

SUMMARY OF THE INVENTION

Thus, a method and system for filtering detection patterns in a QR code is provided in this invention to solve the problem in the prior art of unable to remove detection patterns caused by interference appropriately when more than three detection patterns are detected.

In order to solve the above problems, this invention is implemented in the following technical solutions.

A method for filtering detection patterns in a QR code, characterized in comprising the following steps:
  obtaining a plurality of patterns to be detected;
  determining a side length for each pattern to be detected;
  determining an average value of the side length of the plurality of patterns to be detected according to the side length of each pattern to be detected;
  determining a reference value for the detections patterns according to the average value and the side length of each pattern to be detected;
  comparing the side length of each pattern to be detected with the reference value, and determining patterns to be detected that meet a predetermined condition as detection patterns.

Further, the process of determining a reference value for the detections patterns according to the average value and the side length of each pattern to be detected comprises:
  determining a standard deviation for the plurality of patterns to be detected according to the average value and the side length of each pattern to be detected;
  determining the reference value according to the average value and the standard deviation.

Further, the standard deviation Std is determined according to the following equation:

$$Std = \sqrt{\frac{1}{N}\sum_{i=1}^{N}(S_i - Avg)^2}$$

wherein, N is the number of patterns to be detected, $S_i$ is the side length of the ith pattern to be detected, Avg is the average value, i is an integer and $1 \leq i \leq N$.

Further, the reference value E is determined according to the following equation:
  $E = \max(n \times Avg, Std)$, wherein, n is an adjustment coefficient and $0 < n < 1$.

Further, the adjustment coefficient is $n = 0.2$.

Further, in the process of comparing the side length of each pattern to be detected with the reference value, and determining patterns to be detected that meet a predetermined condition as detection patterns:
  the predetermined condition is $|S_i - Avg| \leq E$.

Further, the method comprises the following steps:
  determining the number of patterns to be detected that meet the predetermined condition, wherein if the number is three or less, the filtering process ends; otherwise, the following step is performed:
  obtaining triangles consisted of the central points of any three patterns to be detected;
  determining the shape of each triangle, and determining three patterns to be detected corresponding to a triangle most approximate to an isosceles right triangle as detection patterns.

Further, the process of determining the shape of each triangle, and determining three patterns to be detected corresponding to a triangle most approximate to an isosceles right triangle as detection patterns comprises:

obtaining a decision factor for each triangle according to the following equation:

$$F = \left|\frac{L_2}{L_3} - 1\right| + \left|\frac{L_1^2}{L_2^2 + L_3^2} - 1\right|$$

wherein, $L_1, L_2, L_3$ are lengths of three sides of the triangle; and three patterns to be detected corresponding to the three vertexes of a triangle having a minimum decision factor are determined as detection patterns.

A system for filtering detection patterns in a QR code, characterized in comprising:

a pattern obtaining module, for obtaining a plurality of patterns to be detected;

a pattern side length determining module, for determining a side length for each pattern to be detected;

an average value obtaining module, for determining an average value of the side length of the plurality of patterns to be detected according to the side length of each pattern to be detected;

a reference value determining module, for determining a reference value for the detections patterns according to the average value and the side length of each pattern to be detected;

a detection pattern determining module, for comparing the side length of each pattern to be detected with the reference value, and determining patterns to be detected that meet a predetermined condition as detection patterns.

Further, the reference value determining module comprises:

a standard deviation obtaining unit, for determining a standard deviation for the plurality of patterns to be detected according to the average value and the side length of each pattern to be detected;

a reference value obtaining unit, for determining the reference value according to the average value and the standard deviation.

Further, the standard deviation obtaining unit determines the standard deviation Std according to the following equation:

$$Std = \sqrt{\frac{1}{N}\sum_{i=1}^{N}(S_i - Avg)^2}$$

wherein, N is the number of patterns to be detected, Si is the side length of the ith pattern to be detected, Avg is the average value, i is an integer and $1 \leq i \leq N$.

Further, the reference value obtaining unit determines the reference value E according to the following equation:

E=max(n×Avg, Std), wherein, n is an adjustment coefficient and 0<n<1.

Further, the reference value obtaining unit sets the adjustment coefficient to n=0.2.

Further, the predetermined condition in the detection pattern determining module is |Si−Avg|≤E.

Further, the system comprises:

a pattern number determining module, for determining the number of patterns to be detected that meet the predetermined condition;

a triangle obtaining module, for if the number of patterns to be detected that meet the predetermined condition is more than three, obtaining triangles consisted of the central points of any three patterns to be detected;

the detection pattern determining module is configured to determine the shape of each triangle, and determine three patterns to be detected corresponding to a triangle most approximate to an isosceles right triangle as detection patterns.

Further, the detection pattern determining module comprises:

a decision factor obtaining unit, for obtaining a decision factor for each triangle according to the following equation:

$$F = \left|\frac{L_2}{L_3} - 1\right| + \left|\frac{L_1^2}{L_2^2 + L_3^2} - 1\right|$$

wherein, $L_1, L_2, L_3$ are lengths of three sides of the triangle;

a detection pattern determining unit, for determining three patterns to be detected corresponding to the three vertexes of a triangle having a minimum decision factor as detection patterns.

The technical solutions of this invention have the following advantages over the prior art:

(1) In the method and system for filtering detection patterns in a QR code of this invention, when multiple detection patterns get into a QR code image due to interference or other reasons, first of all, an side length is determined for each pattern to be detected, and then an average value of the side lengths of multiple patterns to be detected is determined, after which through comparing with a predetermined reference value, patterns to be detected meeting a predetermined condition are determined as detection patterns. An effective solution is provided to fill the gap in the prior art of unable to remove detection patterns caused by interference appropriately when more than three detection patterns are found.

(2) In the method and system for filtering detection patterns in a QR code of this invention, a predetermined condition is provided based on the side length of each pattern to be detected and an average value of the side lengths of the multiple patterns to be detected, which has been verified in many experiments, and thus has strong operability and feasibility. Some or all unwanted detection patterns may be removed through setting a reasonable predetermined condition. In general, all detection patterns caused by interference may be effectively removed from multiple detection patterns, and three detection patterns may be found appropriately.

(3) In the method and system for filtering detection patterns in a QR code of this invention, a flexible and progressive filtering scheme is provided, including determining the number of detection patterns, determining whether the difference between the side length of each detection pattern and a reference value is within the range of a predetermined condition, and determining the geometrical relationship between remaining detection patterns if the number of the remaining detection patterns is still larger than three, to finally select the real detection patterns. Detection patterns introduced by interference may be effectively removed from multiple detection patterns to obtain three detection patterns. No further filtering is required after three detection patterns are found.

Thus, unnecessary detection steps may be saved in different situations to speed up the filtering.

(4) In the method and system for filtering detection patterns in a QR code of this invention, a factor of deformations is fully considered in the filtering of detection patterns, i.e., the three detection patterns may always in a relation of an isosceles right triangle no matter how the QR code image deforms. In practice, taking deformations into consideration, a loose decision condition is adopted in the filtering. With such an improvement, instead of making a determination merely based on small differences between the sizes of modules, the geometrical relationship between the detection patterns is fully considered. In the case of several patterns to be detected have been found, detection patterns may be selected more accurately, and thus the accuracy of detection pattern filtering may be improved.

(5) In the method and system for filtering detection patterns in a QR code of this invention, after the three detection patterns are selected appropriately, based on the location relationship between these detection patterns in the entire QR code, locations of these three detection patterns are determined accurately, and these detection patterns are sorted to facilitate a CCD reading device to determine the QR code accurately and then read the QR code's module length, version, and the number of modules to get ready for the decoding of the QR code.

BRIEF DESCRIPTION OF THE DRAWINGS

For a clear understanding of the content of this invention, this invention will be further described according to particular embodiments in reference to drawings.

1—upper left detection pattern
2—upper right detection pattern
3—lower left detection pattern

DESCRIPTION OF THE EMBODIMENTS

Embodiment 1

Figure 2:
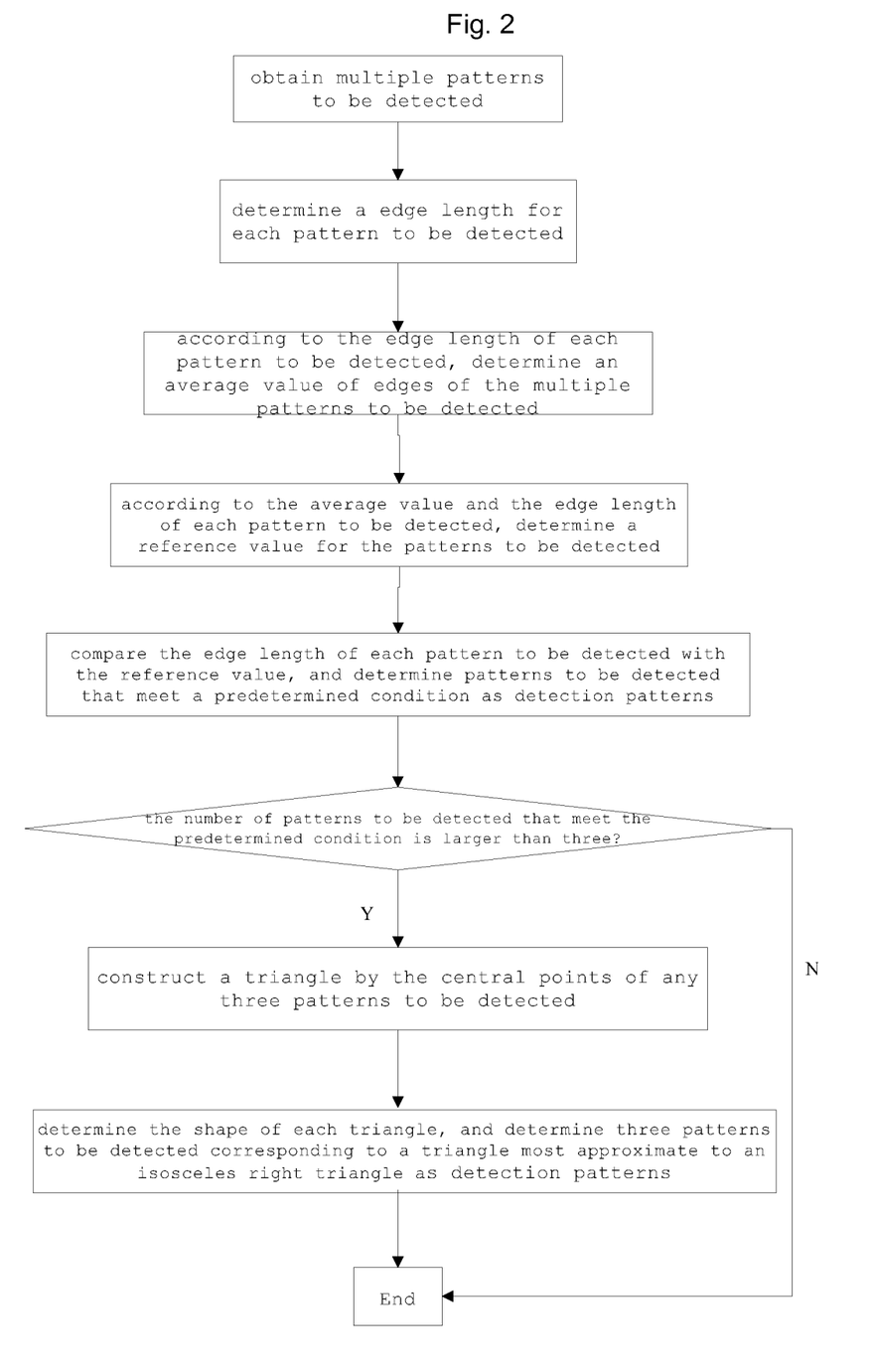
FIG. 2 is a flowchart of a method for filtering detection patterns in a QR code according to an embodiment.

A method for filtering detection patterns in a QR code is provided in this embodiment, which as shown in FIG. 2 comprises the following steps:

obtaining a plurality of patterns to be detected;
determining a side length for each pattern to be detected;
determining an average value of the side length of the plurality of patterns to be detected according to the side length of each pattern to be detected;
determining a reference value for the detections patterns according to the average value and the side length of each pattern to be detected;
comparing the side length of each pattern to be detected with the reference value, and determining patterns to be detected that meet a predetermined condition as detection patterns.

Each QR code comprises three detection patterns. However, in practice, there may be situations where more than three detection patterns exist in the entire detection picture. This may be caused by including unwanted detection patterns that are introduced by interference, or patterns formed by other text or symbols in the picture and having similar structural characteristics to detection patterns that are determined as detection patterns by mistake. This embodiment is directed to a situation in which the number of detection patterns that are detected is larger than 3. If the number of detection patterns that are initially detected is just 3, a common algorithm is adequate to its purpose without the need of a filtering process according to this embodiment. If the number of detection patterns that are initially detected is less than 3, those patterns are not detection patterns in a QR code, and an error may be returned directly.

Because all detection patterns in a code image are identical square patterns, in theory, those detection patterns have the same side length, which may be a horizontal side length or a vertical side length. For patterns to be detected that are not detection patterns in the code image, although they may be similar to detection patterns, i.e., in shapes of square, their side lengths may significantly differ from the side length of real detection patterns. Therefore, based on the average value and the side length of each pattern to be detected, a reference value is determined for each pattern to be detected. Further the side length of each pattern to be detected is compared with the reference value to determine patterns to be detected meeting a predetermined condition as detection patterns. As a result, an accurate result may be obtained.

In the method for filtering detection patterns in a QR code provided in this embodiment, when multiple detection patterns get into a QR code image due to interference or other reasons, first of all, an side length is determined for each pattern to be detected, and then an average value of the side lengths of multiple patterns to be detected is determined, after which through comparing with a predetermined reference value, patterns to be detected meeting a predetermined condition are determined as detection patterns. An effective solution is provided to fill the gap in the prior art of unable to remove detection patterns caused by interference appropriately when more than three detection patterns are detected.

For a better implementation of the solution of this embodiment by those skilled in the art, the solution of this embodiment will be particularly described with equations below. The step of determining a reference value for the detections patterns according to the average value and the side length of each pattern to be detected comprises:

determining a standard deviation for the plurality of patterns to be detected according to the average value and the side length of each pattern to be detected;
determining the reference value according to the average value and the standard deviation.

The standard deviation Std is determined according to the following equation:

$$Std = \sqrt{\frac{1}{N}\sum_{i=1}^{N}(S_i - Avg)^2}$$

wherein, N is the number of patterns to be detected, Si is the side length of the ith pattern to be detected, Avg is the average value, i is an integer and 1≤i≤N.

The reference value E is determined according to the following equation:

E=max(n×Avg, Std), wherein, n is an adjustment coefficient and 0<n<1.

According to practical detection situations, only in some rare cases, a large number of detection patterns may be detected. As limited by detection devices, the number of detection patterns that are detected is generally not large, which are, in most cases, suspected detection patterns that are actually not detection patterns and are determined by mistake. Briefly, except cases such as deformations and severe distortions, actual detection patterns have similar sizes, while those detection patterns that are determined by mistake have sizes significantly different to the size of actual detection patterns, in a relatively large number as well. In the above filtering step, at first, a standard deviation is obtained and then a reference value is determined. Finally, through comparing with a predetermined condition that is set reasonably, detection patterns meeting the condition are selected. Setting a reasonable predetermined condition may effectively remove some or all unwanted detection patterns.

Through many experiments, a better filtering result may be obtained when the adjustment coefficient is n=0.2, which may remove too large or too small detection patterns to the most extent while ensuring that actual detection patterns may not be removed. Thus, in this embodiment, preferably, n=0.2. Those skilled in the art may appreciate that other values of n are also within the protection scope of this embodiment, which will not be described further herein.

In the step of comparing the side length of each pattern to be detected with the reference value, and determining patterns to be detected that meet a predetermined condition as detection patterns:

the predetermined condition is |Si−Avg|≤E.

The predetermined condition is set as |Si−Avg|≤E, that is, the difference between the side length of each pattern to be detected and the average value of the multiple patterns to be detected is compared with the reference value to determine whether it is a detection pattern. The predetermined condition is set based on a full consideration of the side length of each pattern to be detected and the average value of the multiple patterns to be detected, which is obtained from many experiments and has strong operability and feasibility. Through setting a reasonable predetermined condition, some or all unwanted detection patterns may be removed effectively. In general, all detection patterns introduced by interference may be effectively removed from multiple detection patterns that have been detected, and three detection patterns may be found. Those skilled in the art may appreciate that the predetermined condition |Si−Avg|≤E is merely a preferred embodiment, and this invention reserves the right of adopting other predetermined conditions.

Figure 3:
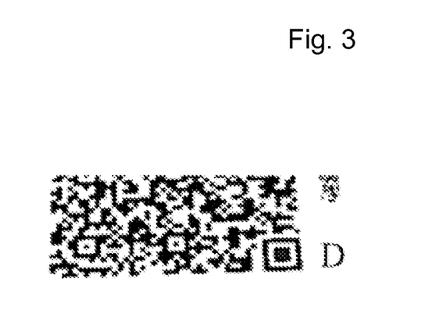
FIG. 3 is a flowchart of a method for filtering detection patterns in a QR code according to an embodiment.

Some detection patterns may be removed through the above filtering step, making the number of remaining detection patterns equal to 3, in which case, the process may proceed to a sorting step. However, the above filtering step cannot completely make sure that the number of detection patterns that are detected is equal to 3. In the case of a number of detection patterns larger than 3, a further filtering step is required to ensure the accuracy of the filtering. As shown in FIG. 3, this embodiment may further comprise the following step:

determining the number of patterns to be detected that meet the predetermined condition, wherein if the number is three or less, the filtering process ends; otherwise, the following step is performed:

obtaining triangles consisted of the central points of any three patterns to be detected;

determining the shape of each triangle, and determining three patterns to be detected corresponding to a triangle most approximate to an isosceles right triangle as detection patterns.

a flexible and progressive filtering scheme is provided in this embodiment, including determining the number of detection patterns, determining whether the difference between the side length of each detection pattern and a reference value is within the range of a predetermined condition, and determining the geometrical relationship between remaining detection patterns if the number of the remaining detection patterns is still larger than three, to finally select the real detection patterns. Detection patterns introduced by interference may be effectively removed from multiple detection patterns that have been detected to find three detection patterns. No further filtering is required after three detection patterns are found. Thus, unnecessary detection steps may be saved in different situations to speed up the filtering.

The process of determining the shape of each triangle, and determining three patterns to be detected corresponding to a triangle most approximate to an isosceles right triangle as detection patterns comprises:

obtaining a decision factor for each triangle according to the following equation:

$$F = \left|\frac{L_2}{L_3} - 1\right| + \left|\frac{L_1^2}{L_2^2 + L_3^2} - 1\right|$$

wherein, $L_1, L_2, L_3$ are lengths of three sides of the triangle; and three patterns to be detected corresponding to the three vertexes of a triangle having a minimum decision factor are determined as detection patterns.

Based on locations of the detection patterns in the QR code, a triangle may be constructed. The three detection patterns may substantially form an isosceles right triangle. If the central points of three detection patterns cannot form a triangle, the three patterns to be detected are definitely not detection patterns to be found. When a triangle may be formed by three detection patterns, if only three patterns to be detected may form a triangle and remaining detection patterns cannot form a triangle, the three patterns to be detected may be directly determined as detection patterns. If there are several sets of patterns to be detected that may form a triangle, a further determination is required based on a triangle decision factor.

The triangle decision factor is constructed to determine the degree of a triangle approximating to an isosceles right triangle. The smaller the triangle decision factor is, the more it approximates to an isosceles right triangle. A combination of three detection patterns corresponding to a triangle with the minimum triangle decision factor is one of all combinations of patterns to be detected that is most approximate to an isosceles right triangle. Thereby, the three candidate patterns may be considered as detection patterns.

In the method for filtering detection patterns in a QR code provided in this embodiment, a factor of deformations is fully considered when detection patterns are filtered based on their geometrical relationship, i.e., the three detection patterns may always form an isosceles right triangle no matter how they deform. In practice, taking deformations into consideration, a loose decision condition is adopted in the filtering. With such an improvement, instead of making a determination merely based on small differences between the sizes of modules, the geometrical relationship between the detection patterns is fully considered. In the case of finding lots of detection patterns, the targets may be filtered more accurately, and thus the accuracy of filtering detection patterns may be improved.

In the method for filtering detection patterns in a QR code provided in this embodiment, when multiple detection patterns get into a QR code image due to interference or other reasons, a multi-level filtering mechanism is adopted to accurately select detection patterns, including determining the number of detection patterns, determining whether the difference between the side length of each pattern and a reference value satisfies a predetermined condition, and determining the geometrical relationship between remaining detection patterns if the number of the remaining detection patterns is still larger than three, to finally select the real detection patterns. With such a multi-level filtering mechanism, detection patterns introduced by interference may be effectively removed from multiple detection patterns to find three detection patterns.

Embodiment 2

The method for filtering detection patterns in a QR code provided in this embodiment has made improvements based on embodiment 1, and comprises the following steps:

determining the number of patterns to be detected: when the number of patterns to be detected is less than 3, return with an error; when the number of patterns to be detected is equal to 3, all the three patterns to be detected are detection patterns and the process directly enters into the sorting step; when the number of patterns to be detected is larger than 3, the process enters a filtering step to select three detection patterns.

Filtering step: the filtering method as described in embodiment 1;

Sorting step: sorting three detection patterns.

Figure 4:
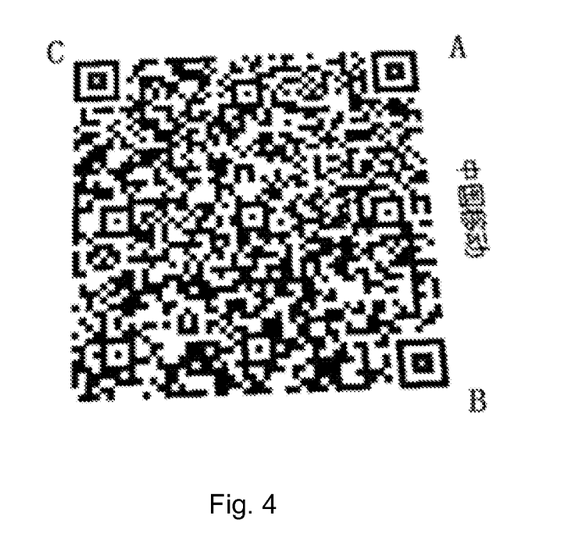
FIG. 4 is an effect diagram of the method for filtering detection patterns in a QR code according to an embodiment.

At first, the number of patterns to be detected is determined in this embodiment. When the number is less than 3, a basic requirement of three detection patterns contained in the QR code is not satisfied, and an error is returned to notify that not all detection patterns have been detected. When the number is 3, the process directly proceeds to a sorting step. The step for filtering the detection patterns as described in embodiment 1 is only performed when the number of patterns to be detected is larger than 3, which will not be further described in detail. An effect diagram obtained through filtering detection patterns according to the method of this embodiment is shown in FIG. 4 which includes four patterns to be detected. After the filtering step, detection patterns are selected successfully, and a unwanted detection pattern is removed.

The sorting step particularly comprises the following steps:

determining a upper left detection pattern: obtaining a longest side of a triangle formed by the three detection patterns, wherein a detection pattern corresponding to the longest side is the upper left detection pattern;

determining a lower left detection pattern and a upper right detection pattern: taking a vertex corresponding to the upper left detection pattern as a centre, the upper right detection pattern is on the anticlockwise direction with respect to the lower left detection pattern;

obtaining QR code information: obtaining the QR code's module length, version information, and the number of modules according to the detection patterns.

Because detection patterns have fixed locations in a QR code, when the detection pattern on the upper left corner is identified, the other two detection patterns may be obtained according to their relative relationships to the upper left detection pattern. This embodiment provides a method for sorting detection patterns through constructing a vector for the triangle.

Figure 5:
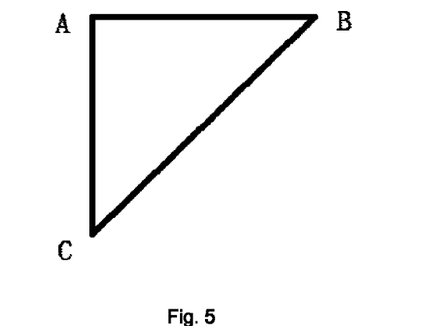
FIG. 5 is a schematic diagram of constructing a triangle according to an embodiment.

Assume that the central points of the three detection patterns obtained in the filtering step are A, B, C respectively, they are resorted to determine their location relationships. FIG. 5 shows their location relationships after the sorting process.

It can be seen from the figure that distances between central points of the three detection patterns satisfy $|AB|<|BC|$, $|AC|<|BC|$ and $\angle BAC<180°$. Based on this relationship, it may be determined that A is a vertex of the triangle corresponding to the longest side of the triangle formed by the three detection patterns. And thus the detection pattern corresponding to point A is the detection pattern on the upper left corner. After that, locations of the other two detection patterns are determined. Because point C is on the clockwise direction with respect to point B, this embodiment takes advantage of this to make a determination based on a vector.

If the $\vec{k}$ component of $\vec{AC} \times \vec{AB}$ is positive, i.e., $(Cx-Ax)(By-Ay)-(Cy-Ay)(Bx-Ax)>0$, it may be known according to mathematics knowledge that point C is on the clockwise direction with respect to point B. Note that the upper left corner, the upper right corner and the lower left corner are described in this embodiment in a relative but not absolute manner. Wherein, the detection pattern on the upper left corner locates on the right angle vertex of the right triangle. Taking the detection pattern on the right angle vertex as a centre, the upper right detection pattern is on the anticlockwise direction with respect to the lower left detection pattern. This relationship about location is not affected by the orientation of the QR code. Certainly, those skilled in the art may appreciate that sorting detection patterns through constructing a vector is merely one exemplary implementation, and this embodiment is not limited thereto. Other implementations are also possible within the protection scope of this embodiment.

In the method for filtering detection patterns in a QR code provided in this embodiment, after actual detection patterns are accurately selected, a vector relationship is constructed based on location relationships of these detection patterns in the QR code. Then, location relationships of the three vertexes are determined accurately. The detection patterns are sorted to facilitate a CCD reading device to determine the QR code accurately and then read the QR code's module length, version information, and the number of modules to get ready for the decoding of the QR code.

Embodiment 3

Figure 6:
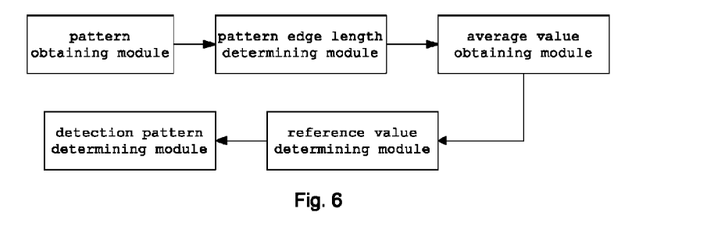
FIG. 6 is a structural diagram of a system for filtering detection patterns in a QR code according to an embodiment.

A system for filtering detection patterns in a QR code is provided in this embodiment, which as shown in FIG. 6 comprises:

a pattern obtaining module, for obtaining a plurality of patterns to be detected;

a pattern side length determining module, for determining a side length for each pattern to be detected;

an average value obtaining module, for determining an average value of the side length of the plurality of patterns to be detected according to the side length of each pattern to be detected;

a reference value determining module, for determining a reference value for the detections patterns according to the average value and the side length of each pattern to be detected;

a detection pattern determining module, for comparing the side length of each pattern to be detected with the reference value, and determining patterns to be detected that meet a predetermined condition as detection patterns.

Each QR code comprises three detection patterns. However, in practice, there may be situations where more than three detection patterns exist in the entire detection picture. This may be caused by including unwanted detection patterns that are introduced by interference, or patterns formed by other text or symbols in the picture and having similar structural characteristics to detection patterns that are determined as detection patterns by mistake. This embodiment is directed to a situation in which the number of detection patterns that are detected is larger than 3. If the number of detection patterns that are initially detected is just 3, a common algorithm is adequate to its purpose without the need of a filtering process according to this embodiment. If the number of detection patterns that are initially detected is less than 3, those patterns are not detection patterns in a QR code, and an error may be returned directly.

Because all detection patterns in a code image are identical square patterns, in theory, those detection patterns have the same side length, which may be a horizontal side length or a vertical side length. For patterns to be detected that are not detection patterns in the code image, although they may be similar to detection patterns, i.e., in shapes of square, their side lengths may significantly differ from the side length of real detection patterns. Therefore, based on the average value and the side length of each pattern to be detected, a reference value is determined for each pattern to be detected. Further the side length of each pattern to be detected is compared with the reference value to determine patterns to be detected meeting a predetermined condition as detection patterns. As a result, an accurate result may be obtained.

In the system for filtering detection patterns in a QR code provided in this embodiment, when multiple detection patterns get into a QR code image due to interference or other reasons, first of all, an side length is determined for each pattern to be detected, and then an average value of the side lengths of multiple patterns to be detected is determined, after which through comparing with a predetermined reference value, patterns to be detected meeting a predetermined condition are determined as detection patterns. An effective solution is provided to fill the gap in the prior art of unable to remove detection patterns caused by interference appropriately when more than three detection patterns are detected.

For a better implementation of the solution of this embodiment by those skilled in the art, the solution of this embodiment will be particularly described with equations below.

The reference value determining module comprises:

a standard deviation obtaining unit, for determining a standard deviation for the plurality of patterns to be detected according to the average value and the side length of each pattern to be detected;

a reference value obtaining unit, for determining the reference value according to the average value and the standard deviation.

The standard deviation obtaining unit determines the standard deviation Std according to the following equation:

$$Std = \sqrt{\frac{1}{N}\sum_{i=1}^{N}(S_i - Avg)^2}$$

wherein, N is the number of patterns to be detected, Si is the side length of the ith pattern to be detected, Avg is the average value, i is an integer and $1 \leq i \leq N$.

The reference value obtaining unit determines the reference value E according to the following equation:

E=max(n×Avg, Std), wherein, n is an adjustment coefficient and 0<n<1.

According to practical detection situations, only in some rare cases, a large number of detection patterns may be detected. As limited by detection devices, the number of detection patterns that are detected is generally not large, which are, in most cases, suspected detection patterns that are actually not detection patterns and are determined by mistake. Briefly, except cases such as deformations and severe distortions, actual detection patterns have similar sizes, while those detection patterns that are determined by mistake have sizes significantly different to the size of actual detection patterns, in a relatively large number as well. In the above filtering step, at first, a standard deviation is obtained and then a reference value is determined. Finally, through comparing with a predetermined condition that is set reasonably, detection patterns meeting the condition are selected. Setting a reasonable predetermined condition may effectively remove some or all unwanted detection patterns.

Through many experiments, a better filtering result may be obtained when the adjustment coefficient is set to n=0.2 in the reference value obtaining unit, which may remove too large or too small detection patterns to the most extent while ensuring that actual detection patterns may not be removed. Thus, in this embodiment, preferably, n=0.2. Those skilled in the art may appreciate that other values of n are also within the protection scope of this embodiment, which will not be described further herein.

The predetermined condition in the detection pattern determining module is |Si−Avg|≤E.

The predetermined condition is set as |Si−Avg|≤E, that is, the difference between the side length of each pattern to be detected and the average value of the multiple patterns to be detected is compared with the reference value to determine whether it is a detection pattern. The predetermined condition is set based on a full consideration of the side length of each pattern to be detected and the average value of the multiple patterns to be detected, which is obtained from many experiments and has strong operability and feasibility. Through setting a reasonable predetermined condition, some or all unwanted detection patterns may be removed effectively. In general, all detection patterns introduced by interference may be effectively removed from multiple detection patterns that have been detected, and three detection patterns may be found. Those skilled in the art may appreciate that the predetermined condition |Si−Avg|≤E is merely a preferred embodiment, and this invention reserves the right of adopting other predetermined conditions.

Figure 7:
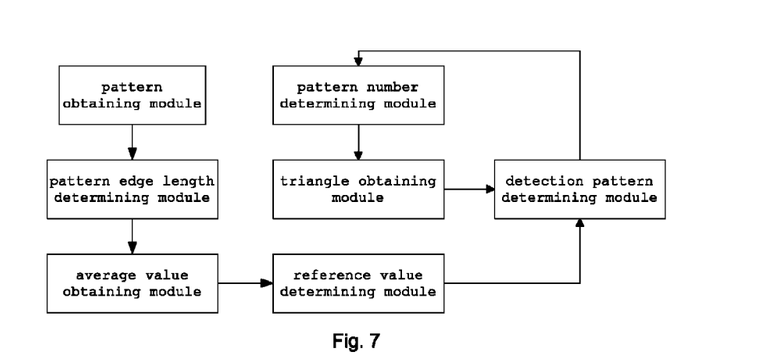
FIG. 7 is a structural diagram of a system for filtering detection patterns in a QR code according to an embodiment.

Some detection patterns may be removed through the above filtering step, making the number of remaining detection patterns equal to 3, in which case, the process may proceed to a sorting step. However, the above filtering step cannot completely make sure that the number of detection patterns that are detected is equal to 3. In the case of a number of detection patterns larger than 3, a further filtering step is required to ensure the accuracy of the filtering. As shown in FIG. 7, this embodiment may further comprise:

determining the number of patterns to be detected that meet the predetermined condition, wherein if the number is three or less than three, the filtering process ends; otherwise, the filtering process continues, and the system of the present invention may further comprise:

a pattern number determining module, for determining the number of patterns to be detected that meet the predetermined condition;

a triangle obtaining module, for if the number of patterns to be detected that meet the predetermined condition is more than three, obtaining triangles consisted of the central points of any three patterns to be detected;

the detection pattern determining module is configured to determine the shape of each triangle, and determine three patterns to be detected corresponding to a triangle most approximate to an isosceles right triangle as detection patterns.

A flexible and progressive filtering scheme is provided in this embodiment, including determining the number of detection patterns, determining whether the difference between the side length of each detection pattern and a reference value is within the range of a predetermined condition, and determining the geometrical relationship between remaining detection patterns if the number of the remaining detection patterns is still larger than three, to finally select the real detection patterns. Detection patterns introduced by interference may be effectively removed from multiple detection patterns that have been detected to find three detection patterns. No further filtering is required after three detection patterns are found. Thus, unnecessary detection steps may be saved in different situations to speed up the filtering.

The detection pattern determining module comprises:

a decision factor obtaining unit, for obtaining a decision factor for each triangle according to the following equation:

$$F = \left| \frac{L_2}{L_3} - 1 \right| + \left| \frac{L_1^2}{L_2^2 + L_3^2} - 1 \right|$$

wherein, $L_1, L_2, L_3$ are lengths of three sides of the triangle;

a detection pattern determining unit, for determining three patterns to be detected corresponding to the three vertexes of a triangle having a minimum decision factor as detection patterns.

Based on locations of the detection patterns in the QR code, a triangle may be constructed. The three detection patterns may substantially form an isosceles right triangle. If the central points of three detection patterns cannot form a triangle, the three patterns to be detected are definitely not detection patterns to be found. When a triangle may be formed by three detection patterns, if only three patterns to be detected may form a triangle and remaining detection patterns cannot form a triangle, the three patterns to be detected may be directly determined as detection patterns. If there are several sets of patterns to be detected that may form a triangle, a further determination is required based on a triangle decision factor.

The triangle decision factor is constructed to determine the degree of a triangle approximating to an isosceles right triangle. The smaller the triangle decision factor is, the more it approximates to an isosceles right triangle. A combination of three detection patterns corresponding to a triangle with the minimum triangle decision factor is one of all combinations of patterns to be detected that is most approximate to an isosceles right triangle. Thereby, the three candidate patterns may be considered as detection patterns.

In the system for filtering detection patterns in a QR code provided in this embodiment, a factor of deformations is fully considered when detection patterns are filtered based on their geometrical relationship, i.e., the three detection patterns may always form an isosceles right triangle no matter how they deform. In practice, taking deformations into consideration, a loose decision condition is adopted in the filtering. With such an improvement, instead of making a determination merely based on small differences between the sizes of modules, the geometrical relationship between the detection patterns is fully considered. In the case of finding lots of detection patterns, the targets may be filtered more accurately, and thus the accuracy of filtering detection patterns may be improved.

In the system for filtering detection patterns in a QR code provided in this embodiment, when multiple detection patterns get into a QR code image due to interference or other reasons, a multi-level filtering mechanism is adopted to accurately select detection patterns, including determining the number of detection patterns, determining whether the difference between the side length of each pattern and a reference value satisfies a predetermined condition, and determining the geometrical relationship between remaining detection patterns if the number of the remaining detection patterns is still larger than three, to finally select the real detection patterns. With such a multi-level filtering mechanism, detection patterns introduced by interference may be effectively removed from multiple detection patterns to find three detection patterns.

Embodiment 4

The system for filtering detection patterns in a QR code provided in this embodiment has made improvements based on embodiment 3, and comprises:

module for determining the number of patterns to be detected: when the number of patterns to be detected is less than 3, return with an error; when the number of patterns to be detected is equal to 3, all the three patterns to be detected are detection patterns and the process directly enters into the sorting step; when the number of patterns to be detected is larger than 3, the process enters a filtering step to select three detection patterns.

Filtering module: the filtering method as described in embodiment 3;

Sorting module: sorting three detection patterns.

At first, the number of patterns to be detected is determined in this embodiment. When the number is less than 3, a basic requirement of three detection patterns contained in the QR code is not satisfied, and an error is returned to notify that not all detection patterns have been detected. When the number is 3, the process directly proceeds to a sorting step. The step for filtering the detection patterns as described in embodiment 3 is only performed when the number of patterns to be detected is larger than 3, which will not be further described in detail. An effect diagram obtained through filtering detection patterns according to the system of this embodiment is shown in FIG. 4 which includes four patterns to be detected. After the filtering module, detection patterns are selected successfully, and a unwanted detection pattern is removed.

The sorting module particularly comprises:

Unit for determining a upper left detection pattern: obtaining a longest side of a triangle formed by the three detection patterns, wherein a detection pattern corresponding to the longest side is the upper left detection pattern;

Unit for determining a lower left detection pattern and a upper right detection pattern: taking a vertex corresponding to the upper left detection pattern as a centre, the upper right detection pattern is on the anticlockwise direction with respect to the lower left detection pattern;

Unit for obtaining QR code information: obtaining the QR code's module length, version information, and the number of modules according to the detection patterns.

Because detection patterns have fixed locations in a QR code, when the detection pattern on the upper left corner is identified, the other two detection patterns may be obtained according to their relative relationships to the upper left detection pattern. This embodiment provides a method for sorting detection patterns through constructing a vector for the triangle.

Assume that the central points of the three detection patterns obtained in the filtering step are A, B, C respectively, they are resorted to determine their location relationships. FIG. 5 shows their location relationships after the sorting process.

It can be seen from the figure that distances between central points of the three detection patterns satisfy |AB|<|BC|, |AC|<|BC| and ∠BAC<180°. Based on this relationship, it may be determined that A is a vertex of the triangle corresponding to the longest side of the triangle formed by the three detection patterns. And thus the detection pattern corresponding to point A is the detection pattern on the upper left corner. After that, locations of the other two detection patterns are determined. Because point C is on the clockwise direction with respect to point B, this embodiment takes advantage of this to make a determination based on a vector.

If the $\vec{k}$ component of $\vec{AC} \times \vec{AB}$ is positive, i.e., (Cx−Ax)(By−Ay)−(Cy−Ay)(Bx−Ax)>0, it may be known according to mathematics knowledge that point C is on the clockwise direction with respect to point B. Certainly, those skilled in the art may appreciate that sorting detection patterns through constructing a vector is merely one exemplary implementation, and this embodiment is not limited thereto. Other implementations are also possible within the protection scope of this embodiment.

In the system for filtering detection patterns in a QR code provided in this embodiment, after actual detection patterns are accurately selected, a vector relationship is constructed based on location relationships of these detection patterns in the QR code. Then, location relationships of the three vertexes are determined accurately. The detection patterns are sorted to facilitate a CCD reading device to determine the QR code accurately and then read the QR code's module length, version information, and the number of modules to get ready for the decoding of the QR code.

A person skilled in the art should appreciate that the examples of the present application may be provided as method, system, or a computer program product. Therefore, the present application may take the form of completely hardware examples, completely software examples, or hardware and software combined examples. Moreover, the present application may adopt the form of a computer program product implemented on one or more computer readable storage medium (including but not limited to a disk storage, a CD-ROM, an optical disk, etc) containing computer usable program codes.

The present application is described with reference to the flowcharts and/or block diagrams of the method, apparatus (system) and computer program product of the examples of the present invention. It should be understood that a computer program instruction is used to implement each flow and/or block in the flowcharts and/or block diagrams, and combination of flows/blocks in the flowcharts and/or block diagrams. These computer program instructions may be provided to a universal computer, a special computer, an embedded processor or processors of other programmable data processing devices to generate a machine such that an apparatus for implementing the functions specified in one or more flow in the flowcharts and/or one or more blocks in the block diagrams is generated through the instructions executed by the computer or the processor of other programmable data processing devices.

These computer program instructions may also be stored in a computer readable memory that can direct the computer or other programmable data processing devices to work in a particular manner such that the instruction stored in the computer readable memory generates a product including an instruction apparatus, which implements the functions specified in one or more flows in the flowchart and/or one or more blocks in the block diagram.

These computer program instructions may also be loaded in a computer or other programmable data processing devices such that a series of operation steps are executed on the computer or other programmable data processing devices to generate computer implemented processing, and thus the instruction executed on the computer or other programmable data processing devices provides the steps for implementing the functions specified in one or more flows in the flowchart and/or one or more blocks in the block diagram.

Figure 8:
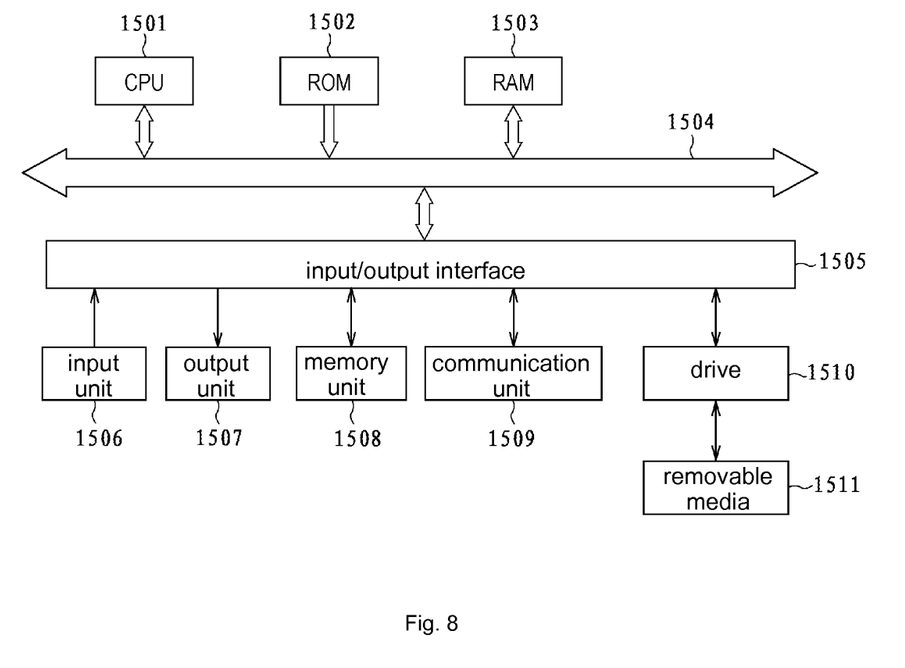
FIG. 8 shows a block diagram of an example of the structure of a computer.

FIG. 8 shows a block diagram of an exemplary computer hardware structure for carrying out the above processes.

A central processing unit (CPU) 1501, read-only memory (ROM) 1502 and random access memory (RAM) 1503 are connected with each other through a bus 1504.

An input/output (I/O) interface 1505 is connected to the bus 1504. Input units 1506 such as a keyboard or mouse and output units 1507 such as a display or a speaker are connected to the I/O interface 1505. In addition, a memory unit 1508 such as a hard disk or non-volatile memory, a communication unit 1509 such as a network interface and a driver 1510 for driving removable media 1511 are connected to the I/O interface 1505.

In the computer configuration described above, the CPU 1501 loads programs stored in the memory unit 1508 to RAM 1503 through the I/O interface 1505 and the bus 1504, and executes the programs to perform the above processes.

The programs executed by the CPU 1501 may be, for example, recorded on the removable media 1511 or may be provided through wired or wireless transmission media (e.g. a LAN, the Internet, or digital broadcasting), and installed in the memory unit 1508.

The programs executed by the computer may be executed according to the order described above, or may be processed whenever necessary (for example, by all).

Although the preferred examples of the present application have been described, a person skilled in the art, once obtaining the basic inventive concept, can make additional variations and modifications to these examples. Therefore, the attached claims are intended to be interpreted as including the preferred examples and all variations and modifications falling into the scope of the present application.

What is claimed is:

1. A method for filtering detection patterns in a QR code, the method comprising:
obtaining a plurality of patterns to be detected;
determining a side length for each pattern to be detected;

determining an average value of the side length of the plurality of patterns to be detected according to the side length of each pattern to be detected;

determining a reference value for the detections patterns according to the average value and the side length of each pattern to be detected;

comparing the side length of each pattern to be detected with the reference value, and determining patterns to be detected that meet a predetermined condition as detection patterns;

wherein patterns having a side length that satisfies the predetermined condition are classified as detection patterns, and patterns having a side length that does not satisfy the predetermined condition are not classified as detection patterns.

2. A method for filtering detection patterns in a QR code, the method comprising:

obtaining a plurality of patterns to be detected;

determining a side length for each pattern to be detected;

determining an average value of the side length of the plurality of patterns to be detected according to the side length of each pattern to be detected;

determining a reference value for the detections patterns according to the average value and the side length of each pattern to be detected;

comparing the side length of each pattern to be detected with the reference value, and determining patterns to be detected that meet a predetermined condition as detection patterns;

wherein the process of determining a reference value for the detections patterns according to the average value and the side length of each pattern to be detected comprises:

determining a standard deviation for the plurality of patterns to be detected according to the average value and the side length of each pattern to be detected;

determining the reference value according to the average value and the standard deviation.

3. The method of claim 2 wherein the standard deviation Std is determined according to the following equation:

$$Std = \sqrt{\frac{1}{N}\sum_{i=1}^{N}(S_i - Avg)^2}$$

wherein, N is the number of patterns to be detected, Si is the side length of the ith pattern to be detected, Avg is the average value, i is an integer and $1 \leq i \leq N$.

4. The method of claim 2 wherein the reference value E is determined according to the following equation:

E=max (n×Avg, Std), wherein, n is an adjustment coefficient and 0<n<1.

5. The method of claim 4 wherein the adjustment coefficient is n=0.2.

6. A method for filtering detection patterns in a QR code, the method comprising:

obtaining a plurality of patterns to be detected;

determining a side length for each pattern to be detected;

determining an average value of the side length of the plurality of patterns to be detected according to the side length of each pattern to be detected;

determining a reference value for the detections patterns according to the average value and the side length of each pattern to be detected;

comparing the side length of each pattern to be detected with the reference value, and determining patterns to be detected that meet a predetermined condition as detection patterns;

wherein comparing the side length of each pattern to be detected with the reference value, and determining patterns to be detected that meet a predetermined condition as detection patterns;

the predetermined condition is $|Si-Avg| \leq E$.

7. A method for filtering detection patterns in a QR code, the method comprising:

obtaining a plurality of patterns to be detected;

determining a side length for each pattern to be detected;

determining an average value of the side length of the plurality of patterns to be detected according to the side length of each pattern to be detected;

determining a reference value for the detections patterns according to the average value and the side length of each pattern to be detected;

comparing the side length of each pattern to be detected with the reference value, and determining patterns to be detected that meet a predetermined condition as detection patterns;

determining the number of patterns to be detected that meet the predetermined condition, wherein if the number is three or less, the filtering process ends; otherwise, the following step is performed:

obtaining triangles consisted of the central points of any three patterns to be detected;

determining the shape of each triangle, and determining three patterns to be detected corresponding to a triangle most approximate to an isosceles right triangle as detection patterns.

8. The method of claim 7 wherein determining the shape of each triangle, and determining three patterns to be detected corresponding to a triangle most approximate to an isosceles right triangle as detection patterns comprises:

obtaining a decision factor for each triangle according to the following equation:

$$F = \left|\frac{L_2}{L_3} - 1\right| + \left|\frac{L_1^2}{L_2^2 + L_3^2} - 1\right|$$

wherein, $L_1, L_2, L_3$ are lengths of three sides of the triangle; and three patterns to be detected corresponding to the three vertexes of a triangle having a minimum decision factor are determined as detection patterns.

9. A system for filtering detection patterns in a QR code, the system comprising:

a pattern obtaining module, for obtaining a plurality of patterns to be detected;

a pattern side length determining module, for determining a side length for each pattern to be detected;

an average value obtaining module, for determining an average value of the side length of the plurality of patterns to be detected according to the side length of each pattern to be detected;

a reference value determining module, for determining a reference value for the detections patterns according to the average value and the side length of each pattern to be detected;

a detection pattern determining module, for comparing the side length of each pattern to be detected with the reference value, and determining patterns to be detected that meet a predetermined condition as detection patterns;

wherein patterns having a side length that satisfies the predetermined condition are classified as detection patterns, and patterns having a side length that does not satisfy the predetermined condition are not classified as detection patterns.

10. A system for filtering detection patterns in a QR code, the system comprising:

a pattern obtaining module, for obtaining a plurality of patterns to be detected;

a pattern side length determining module, for determining a side length for each pattern to be detected;

an average value obtaining module, for determining an average value of the side length of the plurality of patterns to be detected according to the side length of each pattern to be detected;

a reference value determining module, for determining a reference value for the detections patterns according to the average value and the side length of each pattern to be detected;

a detection pattern determining module, for comparing the side length of each pattern to be detected with the reference value, and determining patterns to be detected that meet a predetermined condition as detection patterns;

wherein the reference value determining module comprises:

a standard deviation obtaining unit, for determining a standard deviation for the plurality of patterns to be detected according to the average value and the side length of each pattern to be detected;

a reference value obtaining unit, for determining the reference value according to the average value and the standard deviation.

11. The system of claim 10 wherein the standard deviation obtaining unit determines the standard deviation Std according to the following equation:

$$Std = \sqrt{\frac{1}{N}\sum_{i=1}^{N}(S_i - Avg)^2}$$

wherein, N is the number of patterns to be detected, Si is the side length of the ith pattern to be detected, Avg is the average value, i is an integer and $1 \leq i \leq N$.

12. The system of claim 10 wherein the reference value obtaining unit determines the reference value E according to the following equation:

E=max (n×Avg, Std), wherein, n is an adjustment coefficient and 0<n<1.

13. The system of claim 12 wherein the reference value obtaining unit sets the adjustment coefficient to n=0.2.

14. A system for filtering detection patterns in a QR code, the system comprising:

a pattern obtaining module, for obtaining a plurality of patterns to be detected;

a pattern side length determining module, for determining a side length for each pattern to be detected;

an average value obtaining module, for determining an average value of the side length of the plurality of patterns to be detected according to the side length of each pattern to be detected;

a reference value determining module, for determining a reference value for the detections patterns according to the average value and the side length of each pattern to be detected;

a detection pattern determining module, for comparing the side length of each pattern to be detected with the reference value, and determining patterns to be detected that meet a predetermined condition as detection patterns;

wherein the predetermined condition in the detection pattern determining module is $|Si-Avg| \leq E$.

15. A system for filtering detection patterns in a QR code, the system comprising:

a pattern obtaining module, for obtaining a plurality of patterns to be detected;

a pattern side length determining module, for determining a side length for each pattern to be detected;

an average value obtaining module, for determining an average value of the side length of the plurality of patterns to be detected according to the side length of each pattern to be detected;

a reference value determining module, for determining a reference value for the detections patterns according to the average value and the side length of each pattern to be detected;

a detection pattern determining module, for comparing the side length of each pattern to be detected with the reference value, and determining patterns to be detected that meet a predetermined condition as detection patterns;

a pattern number determining module, for determining the number of patterns to be detected that meet the predetermined condition;

a triangle obtaining module, for if the number of patterns to be detected that meet the predetermined condition is more than three, obtaining triangles consisted of the central points of any three patterns to be detected;

the detection pattern determining module is configured to determine the shape of each triangle, and determine three patterns to be detected corresponding to a triangle most approximate to an isosceles right triangle as detection patterns.

16. The system of claim 15 wherein the detection pattern determining module comprises:

a decision factor obtaining unit, for obtaining a decision factor for each triangle according to the following equation:

$$F = \left|\frac{L_2}{L_3} - 1\right| + \left|\frac{L_1^2}{L_2^2 + L_3^2} - 1\right|$$

wherein, $L_1, L_2, L_3$ are lengths of three sides of the triangle;

a detection pattern determining unit, for determining three patterns to be detected corresponding to the three vertexes of a triangle having a minimum decision factor as detection patterns.

17. A system for filtering detection patterns in a QR code, the system comprising:

a processor, wherein the processor is configured to obtain a plurality of patterns to be detected;

determine a side length for each pattern to be detected;

determine an average value of the side length of the plurality of patterns to be detected according to the side length of each pattern to be detected;

determine a reference value for the detections patterns according to the average value and the side length of each pattern to be detected;

compare the side length of each pattern to be detected with the reference value, and determine patterns to be detected that meet a predetermined condition as detection patterns;

wherein patterns having a side length that satisfies the predetermined condition are classified as detection patterns, and patterns having a side length that does not satisfy the predetermined condition are not classified as detection patterns.

* * * * *